United States Patent
Cecil et al.

(10) Patent No.: US 8,800,031 B2
(45) Date of Patent: Aug. 5, 2014

(54) CONTROLLING ACCESS TO SENSITIVE DATA BASED ON CHANGES IN INFORMATION CLASSIFICATION

(75) Inventors: David Scott Cecil, Bonogin (AU); Peter Terence Cogill, Southport (AU); Daniel McKenzie Taylor, Mermaid Beach (AU)

(73) Assignee: International Business Machines Corporation, Armonk, NY (US)

(*) Notice: Subject to any disclaimer, the term of this patent is extended or adjusted under 35 U.S.C. 154(b) by 223 days.

(21) Appl. No.: 13/020,589

(22) Filed: Feb. 3, 2011

(65) Prior Publication Data
US 2012/0204260 A1    Aug. 9, 2012

(51) Int. Cl.
*G06F 21/00* (2013.01)

(52) U.S. Cl.
USPC .................................... 726/22; 726/1; 726/23

(58) Field of Classification Search
None
See application file for complete search history.

(56) References Cited

U.S. PATENT DOCUMENTS

| | | |
|---|---|---|
| 7,007,301 B2* | 2/2006 | Crosbie et al. ................... 726/23 |
| 7,448,084 B1 | 11/2008 | Apap et al. |
| 7,594,266 B2 | 9/2009 | Mattsson et al. |
| 7,739,510 B2 | 6/2010 | Jung et al. |
| 8,060,596 B1* | 11/2011 | Wootton et al. ............... 709/223 |
| 2005/0182969 A1 | 8/2005 | Ginter et al. |
| 2006/0259948 A1* | 11/2006 | Calow et al. ...................... 726/1 |
| 2009/0158430 A1 | 6/2009 | Borders |
| 2009/0254572 A1 | 10/2009 | Redlich et al. |
| 2009/0293130 A1 | 11/2009 | Henry et al. |
| 2010/0057770 A1* | 3/2010 | Kumashio ..................... 707/102 |
| 2010/0115614 A1* | 5/2010 | Barile et al. .................... 726/22 |
| 2010/0162347 A1 | 6/2010 | Barile |

FOREIGN PATENT DOCUMENTS

JP    07-013828    *    1/1995    .............. G06F 12/00

OTHER PUBLICATIONS 07-013828—Machine Translation, Watanabe Shinichi, File Management System, Jan. 1995.*
Hochberg et al, "NADIR: An Automated System for Detecting Network Intrusion and Misuse," Computers & Security, 12 (1993) 235-248.
Wood, "Planning: A Means to Achieve Data Communications Security," Computer & Security, 8 (1989) 189-199.
Thuraisingham, "Security Checking in Relational Database Management Systems Augmented with Inference Engines," Computers & Security 6 (1987) 479-492.
Porat, "Masking Gateway for Enterprises," Lecture Notes in Computer Science vol. 5533, SpringerLink, pp. 171-191, 2009.

* cited by examiner

*Primary Examiner* — Kaveh Abrishamkar
*Assistant Examiner* — Janusz Kusyk
(74) *Attorney, Agent, or Firm* — Jeffrey S. LaBaw; David H. Judson

(57) ABSTRACT

A Data Loss Prevention (DLP) system includes an automated method for tracking changes to a security classification (e.g., content category) associated with an artifact to determine whether an attempt is being made to subvert a DLP policy. The method exploits the basic principle that, depending on context, the classification of a particular artifact, or a change to an existing classification, may indicate an attempt to subvert the policy. According to the method, an artifact classification state machine is implemented within a DLP system. For each policy-defined content category on each artifact, the machine identifies a content category change that may be of interest, as defined by policy. When a change in a classification has occurred, an artifact notification event (or, more generally, a notification of the change in classification) is issued.

16 Claims, 3 Drawing Sheets

CONTROLLING ACCESS TO SENSITIVE DATA BASED ON CHANGES IN INFORMATION CLASSIFICATION

BACKGROUND OF THE INVENTION

1. Technical Field

This disclosure relates generally to identifying and managing user operations with respect to sensitive information (e.g., intellectual property, personally identifiable information, and the like).

2. Background of the Related Art

Data Loss Prevention (DLP) systems are well-known in the prior art and operate generally to identify, monitor use of, and to control user operations on, sensitive information within an enterprise computing environment. DLP systems are designed to prevent data flow from inside the network to the outside world. This data flow may be unintentional or intentional. Unlike event-based notification systems, DLP provides a policy-based approach for managing how data is discovered and classified on a user's workstation or file server, also known as an "endpoint." In such systems, data of interest (sometimes referred to as an "artifact," an "item" or an "object") is classified into various well-defined "content categories," such as "company confidential" or "personally identifiable information (PII)." Additionally, an artifact may be categorized into none, one, or multiple categories. Understanding of the various categories of documents (or other files of interest) that exist on computer systems within an organization helps to inform authorized personnel having a need to access and manage sensitive data. DLP technologies address the problem of data loss by enforcing policy on artifacts and, in particular, by preventing or auditing actions (such as copying a file to external storage) on artifacts based on content category.

Even with a DLP system in place, users will undoubtedly attempt to subvert the technology, e.g., by attempting to modify a classification for given information. The prior art, however, does not provide any automated techniques for determining (and potentially acting upon) changes in information classification. This subject matter of this disclosure addresses this deficiency.

BRIEF SUMMARY OF THE INVENTION

A Data Loss Prevention (DLP) system includes an automated method for tracking changes to a security classification (e.g., content category) associated with an artifact to determine whether an attempt is being made to subvert a DLP policy. The method exploits the basic principle that, depending on context, the classification of a particular artifact, or a change to an existing classification, may indicate an attempt to subvert the policy. According to the method, an artifact classification state machine is implemented within a DLP system. For each policy-defined content category on each artifact, the machine identifies a content category change that may be of interest, as defined by policy. When a change in a classification has occurred, an artifact notification event (or, more generally, a notification of the change in classification) is issued. Thus, for example, a classification event is triggered when an artifact that is previously unknown to the system is first classified. A declassification event is triggered when an artifact is declassified, i.e., when it is no longer classified within a particular content category. A classification rate event is triggered when there is a significant relative increase in a particular content category on a system. The artifact notification events are then examined so that authorized personnel or systems can make decisions about the validity of the user actions reported by the events.

In one embodiment, a method detects changes to artifact classifications in a system that provides data loss prevention (DLP), wherein a DLP policy identifies one or more classifications. The method preferably is carried out in an automated manner, for each policy-defined classification (e.g., content category) on each of a plurality of artifacts. For a particular artifact, the method begins by classifying content of the artifact into a classification identified in the policy. Then, using a state machine, a determination is made whether a change in the classification of the artifact has occurred. If so, a notification of the change in classification is then generated and may be provided to a DLP server for further action.

In an alternative embodiment, the above-described method is performed in a DLP apparatus. The apparatus comprises a processor, and computer memory that holds computer program instructions executed by the processor to carry out the information classification change detection method.

In another alternative embodiment, the above-described method is performed by a computer program product in a computer readable medium for use in a DLP system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
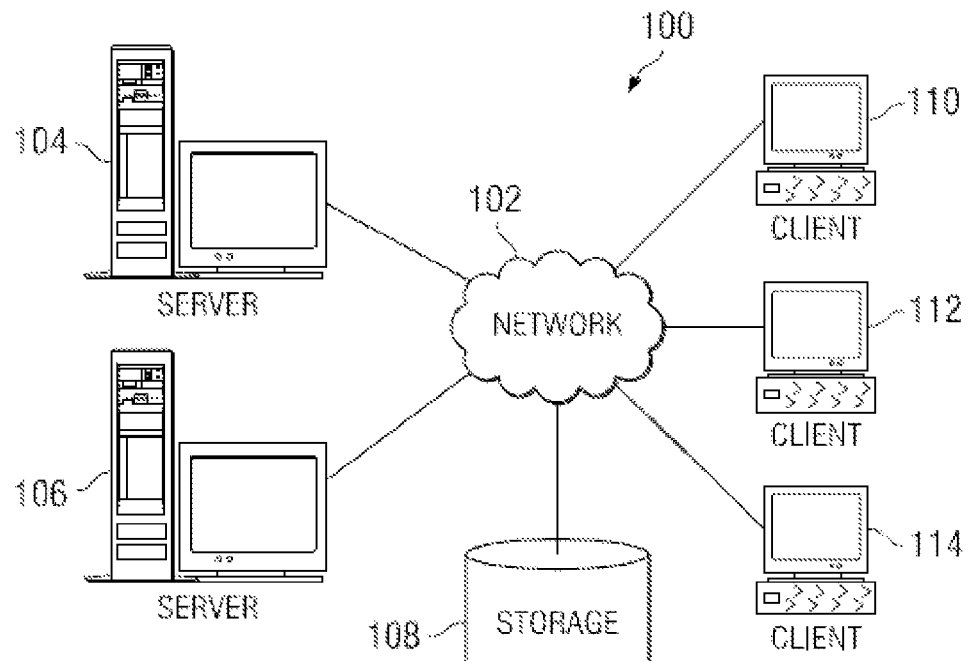
FIG. 1 depicts an exemplary block diagram of a distributed data processing environment in which exemplary aspects of the illustrative embodiments may be implemented.
Figure 2:
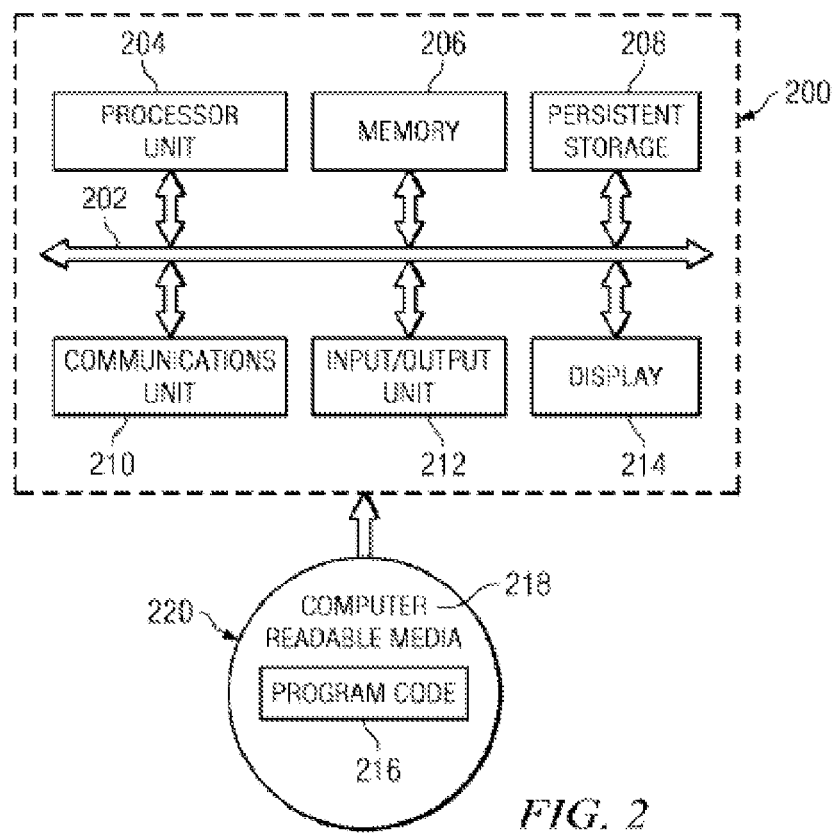
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
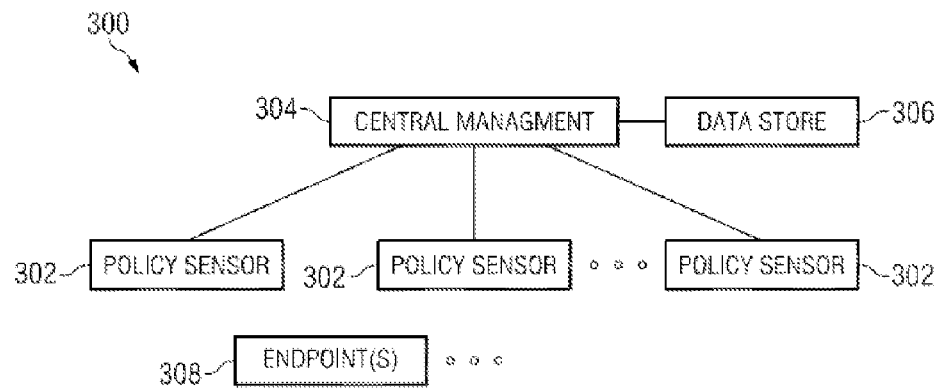
FIG. 3 illustrates a data loss prevention (DLP) solution in which the subject matter of this disclosure may be implemented.

Although not meant to be limiting, a representative data processing system in which the techniques of this disclosure are implemented is an appliance-based data loss prevention (DLP) solution. DLP systems are well-known and work to reduce the risk of sensitive data loss, primarily at the network layer. As seen in FIG. 3, a representative DLP solution 300 comprises a set of distributed components, typically arranged in a tiered architecture. Multiple policy sensors 302 are placed around the network (typically as rack-based appliances, software applications, or the like) and are designed to detect and/or prevent data loss. Generally, in an appliance-based implementation, an appliance may comprise a data processing system such as described in FIG. 2. The appliance includes a policy engine that works generally by capturing packets from the network, reassembling the packets into sessions, analyzing the information flow, extracting content for analysis, and performing content analysis to identify sensitive information. The appliance may use system-defined or user-defined policies, where a policy represents a group of one or more rules. A rule typically is a logical combination of one or more triggers that are content-based, location-based and/or flow-based. Sessions with policy violations are detected by the sensors and forwarded a central management console 304 that distributes policies and collects and organizes alerts. A data store 306 is used to store data and policies, typically in a database. The central management console 304 includes a web-based graphical user interface (GUI) for management, administration and reporting. As used herein, the type of sensitive information protected by such a DLP solution may be quite varied. Typically, such information includes, without limitation, intellectual property (e.g., code, designs, documentation, other proprietary information), identity information (e.g., personally identifiable information (PII)), credit card information (such as PCI-related data), health care information (such as HIPAA-related data), finance information (such as GLBA-related data), and the like. As also seen in FIG. 3, the DLP solution is implemented across one or more endpoints 308.

Preferably, a policy is created and managed in the central management console (such as shown in FIG. 3).

DLP functionality may also be built into other enterprise systems, such as an intrusion detection system (IDS), an intrusion protection system (IPS), network firewalls, web gateways, mail servers or relays, enterprise content management systems, or the like. Thus, for example, an IPS can monitor and detect attack traffic, and DLP support can be added to perform outbound DLP protection and associated blocking of the transfer of sensitive content.

Thus, in general a DLP system in which the subject matter herein is implemented provides a policy-based mechanism for managing how data is discovered and classified on an endpoint workstation, file server or other device within an enterprise. As used herein, in general an endpoint is a data processing system (such as described above in FIG. 2) and that has an associated file system (or equivalent data store). The endpoint may execute DLP software. As noted, a representative endpoint is a data processing system that includes a DLP application that executes as software, i.e., as a set of program instructions, executed from computer memory by a processor. The DLP application is configurable according to a policy, where the policy is created and managed in a central management console (such as shown in FIG. 3). This is not a limitation, however, as a particular DLP policy may be implemented locally (at the endpoint itself).

A DLP policy governs access to artifacts of interest in the system. A policy includes information relating to the classifications of the artifacts. The subject matter of this disclosure assumes that the artifacts are already classified or are being classified with particular classifications, sometimes referred to as "security" classifications.

Figure 4:
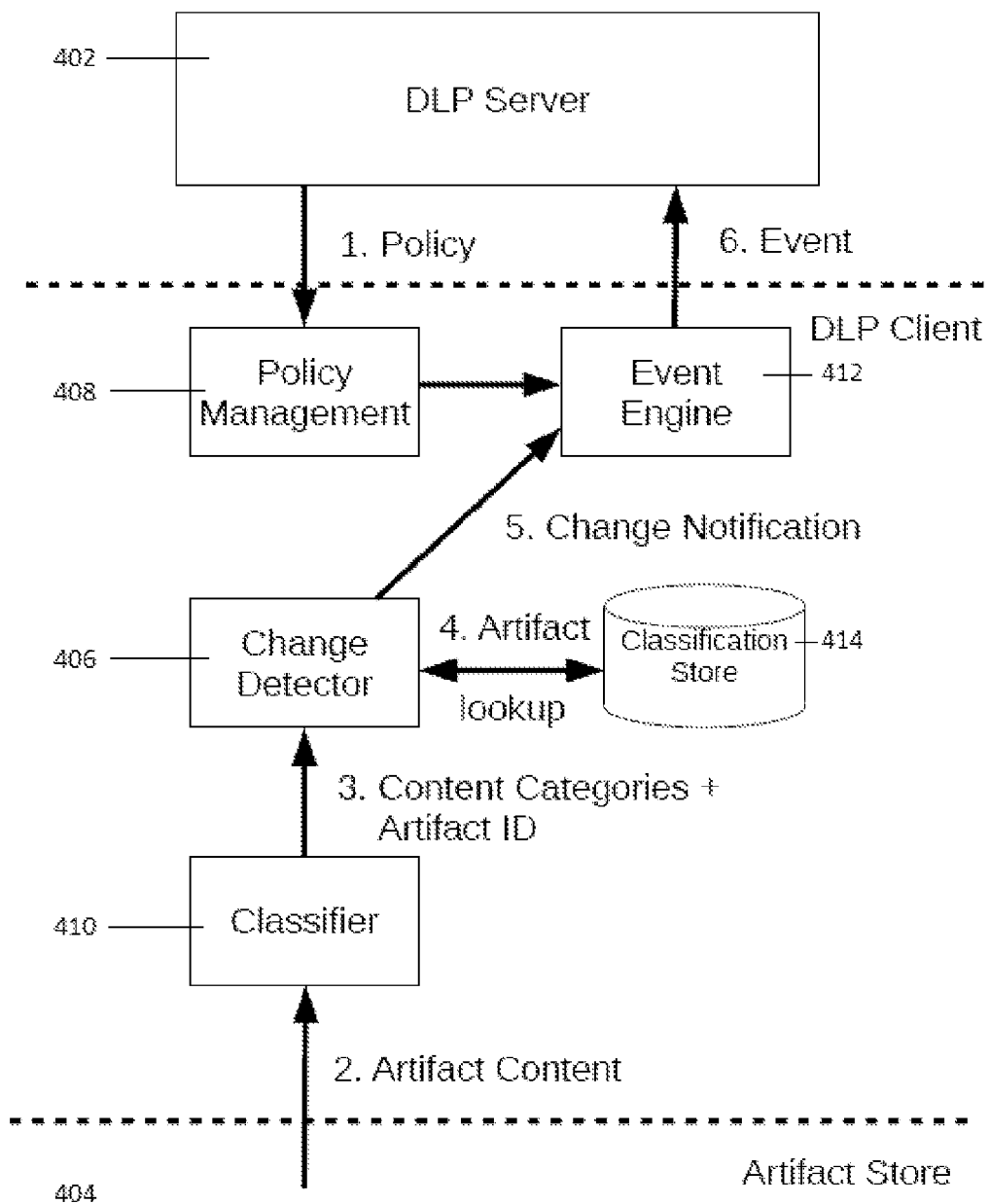
FIG. 4 illustrates an information classification change detection mechanism according to this disclosure.

FIG. 4 illustrates an information classification change detection mechanism 400 according to this disclosure. As illustrated, the mechanism 400 is positioned between a DLP server 402 and an artifact data store 404. Typically, the mechanism is implemented on a DLP client that comprises a set of programs or processes (and associated data) executing on an "endpoint" (e.g., a user's workstation, a file server, or the like), although this is not a limitation. A DLP server 402 is known in the prior art and comprises a set of programs or processes (and associated data) used to define and manage a DLP policy against artifacts that are available in the data store 404. The data store 404 may be local, remote, centralized, or distributed. As has been described, a DLP policy includes content categories (such as "Company Confidential, Personally Identifiable Information, or the like), including (in the context of this disclosure) at least one such content category that is "of interest," i.e., that will be examined for content category changes by the technique described below. According to this disclosure, a DLP policy is extended to also include an artifact number threshold, below which artifacts matching content categories of interest do not generate an event. These attributes may be set through a management console GUI, by programmatic methods, or other known techniques.

The mechanism 400 comprises a set of functional components or modules. Preferably, these components include a change detector 406 that provides the detection function, a policy management component 408, a classifier component 410, and an event engine 412. The mechanism 400 also includes or has associated therewith a classification data store 414. The classification data store 414 may store artifact state information for a particular artifact. These components of the detection mechanism 400 may be integral with one another, or they may be distinct functional components as illustrated. One or more of the components may run in different machines, execution environments or networks. One or more of the components may run as a managed service. One or more components may comprise functions or components of an existing DLP system, such as a known DLP client executing on an endpoint, or a known DLP server. One of ordinary skill will appreciate that the configuration of the mechanism may be varied. Typically, the components illustrated in FIG. 4 are implemented in software, as a set of program instructions, executed by one or more processors.

In operation, at step (1) the DLP server 402 sends a policy to the policy management component 408. As noted above, the policy includes content categories, including at least one such category of interest. At step (2), the classifier component 410 reads the contents of an artifact and classifies it into a content category as specified in the policy that has been sent to the policy management component. At step (3), and with respect to the artifact, the classifier component 410 notifies the change detector 406 of an artifact identifier (ID), content category and a "match flag." A match flag is true if the artifact matches the specified content category. The match flag is false (not true) if the artifact does not match the specified content category. At step (4), the change detector 406 implements a state machine, as will be described below with respect to FIG. 5, using the policy supplied by the policy management component 408 and artifact state information (if present) as retrieved from the classification data store 414. By examining artifact state transitions, the state machine determines content category changes for a given artifact. Based on these transitions (and the information in the policy), at step (5), the change detector notifies the event engine 412. At step (6), the event engine 412 constructs and issues an artifact notification event, and sends that event to the DLP server 402. There are different "types" of notification events, as will be described below. Events that arrive at the DLP server 402 preferably are examined, e.g., using reporting tools, to facilitate the highlighting of particular events of interest. Authorized personnel can then make decisions about the validity of the user actions reported by the events.

Figure 5:
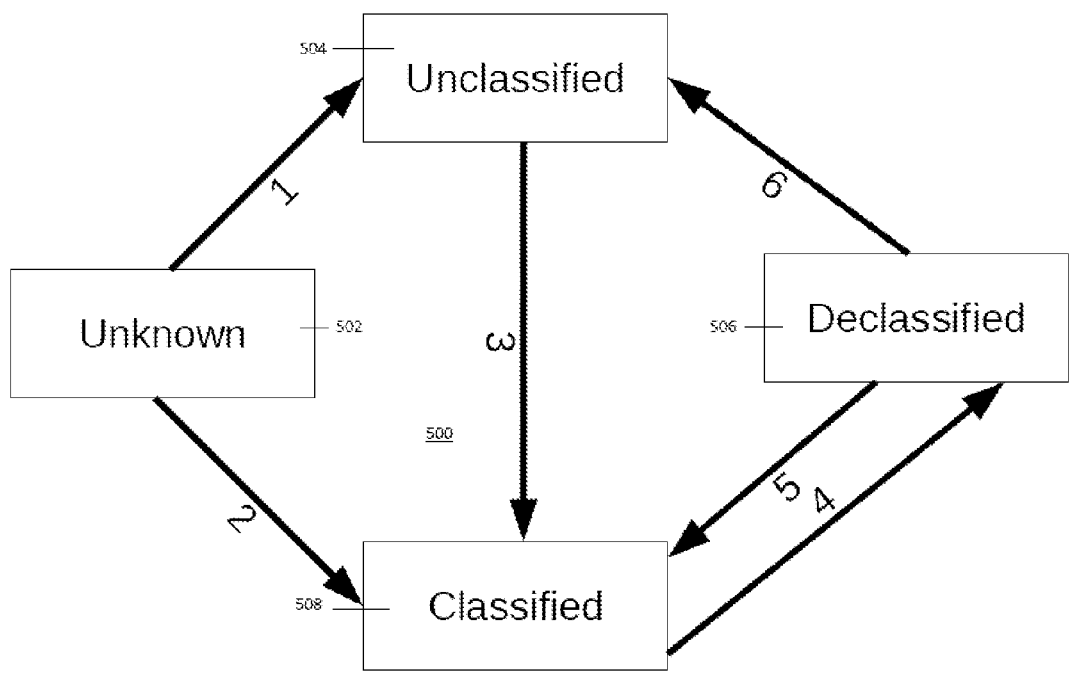
FIG. 5 illustrates a set of artifact classification state transitions that are implemented by the artifact state machine of FIG. 4.

Referring now to FIG. 5, an artifact classification state diagram is shown. This diagram depicts a set of artifact states and various transitions that may be of interest. The change detector 406 in FIG. 4 implements this artifact state machine to determine whether content category changes have occurred for a given artifact. Preferably, the diagram shown in FIG. 5 applies for each known content category for a given artifact.

The state diagram 500 preferably includes the following states: unknown 502, unclassified 504, declassified 506, and classified 508. The "unknown" state 502 refers to the situation wherein no attempt has been made to classify the artifact. There is no record of the artifact in the DLP system. The unclassified state 504 is one in which artifact classification has been attempted, but there is no match for the given content category. The declassified state 506 is one in which artifact classification has been attempted but there is no match for the given content category. The declassified state is for artifacts that were previously categorized in the given content category but no longer match. A policy typically defines how long the artifact should remain in the declassified state. The policy may also define other policy decisions on the artifact to more closely monitor attempted user actions while in the declassified state. As will be described, a transition into this state results in a declassification event being sent to the DLP server. The classified state 508 is one in which artifact classification has been attempted and the given content category matched.

The state diagram 500 identifies a number of transitions, which are now described. In all case, a new state is recorded in the classification data store 414 as the artifact state information. As will be seen, with one exception, all state transitions are the result of a classification attempt on the artifact.

State transition (1) in the diagram identifies a transition from the unknown state 502 to the unclassified state 504. No event is generated for this transition, and there is no match for content category.

State transition (2) in the diagram identifies a transition from the unknown state 502 to the classified state 508. This transition generates a standard artifact classification event. In addition, if content category is of interest (according to the policy), and a number of classifications (as defined in the policy or elsewhere) is greater than a threshold (also as defined in the policy or elsewhere), this transition generates a classification rate event.

State transition (3) in the diagram identifies a transition from the unclassified state 504 to the classified state 508. This transition also generates a standard artifact classification event. As a user generates artifacts, this transition is expected.

State transition (4) in the diagram identifies a transition from the classified state 508 to the declassified state 506. This transition generates an artifact declassification event.

State transition (5) in the diagram identifies a transition from the declassified state 506 to the classified state 508. This transition also generates a standard artifact classification event.

State transition (6) in the diagram identifies a transition from the declassified state 506 to the unclassified state 504. Preferably, a policy defines when and under what circumstances to transition to the unclassified state 504 occurs. Thus, for example, the policy may indicate that transition (6) is only permitted after a predetermined amount of time, upon a number of classification attempts, upon a manual intervention, or the like. The policy also preferably defines what actions to perform (e.g., event generation) as a result of this particular transition.

The above-described nomenclature for the notification events is merely representative. In addition, the state transitions described are representative but provide for a robust set of artifact state classifications and their associated transitions that are implemented by the artifact state machine. Other transition states may be included and used to generate appropriate notifications. As has been described, the artifact state machine implements content category changes for a given artifact, and the state transitions preferably apply for each known content category for an artifact.

The subject matter described herein has many advantages. The technique provides an automated mechanism for tracking the changes to the classification of an artifact, such as a file, an email, a data object, or the like. In a typical operation, if the security classification of a particular artifact changes from one content category to another, then that shift may be used as a flag to alert a supervisor (or an automated system) of an attempt to subvert a policy rule. Additionally, those changes may trigger changes to policy to detect potentially undesirable user behavior and to prevent undesirable user actions. For example, if a document had been categorized as "Company Confidential" and later found (by the artifact state machine) to no longer be categorized as such, such a change could allow the owner to subvert an enforcement policy that otherwise denies copying of the document to a USB memory stick. Additionally, if a large number of objects of a particular category appear on a system, that action may also cause a flag to be raised with appropriate personnel. Once category changes have been detected, authorized personnel can be alerted to suspicious changes, preferably via an event mechanism. In particular, and as described above, preferably a declassification event is triggered when an artifact is declassified, i.e., when it is no longer classified within a particular content category. A classification rate event is triggered when there is a given relative increase in a particular content category on a system.

The detection mechanism typically does not affect whether an operation on an item (e.g., a content change) is or is not carried out by a user. Thus, in a typical case, declassification itself does not prevent access to the object, although subsequent attempts to access the item may be disallowed or authorized personnel notified. By providing such notification, the DLP policy can be adapted as necessary.

The detection mechanism advantageously notifies authorized personnel or systems when classified items appear on a system.

The detection mechanism provides automatic classification of artifacts based on content. Each artifact has a classification state associated with it, and typically the artifact that is in a certain condition is in one of a number of classification states depending on a prior classification state, with different policy allowed to be attached to each state. Preferably, the technique works by applying rules to classes of artifacts.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the DLP information classification change detection functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the artifact state machine described above is implemented in a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing DLP solution.

The DLP central management console exposes one or more web-based interfaces that may be used to create and/or modify a policy, and/or to determine policies applicable to a particular endpoint.

The described functionality may be implemented as an adjunct or extension to an existing DLP solution including, without limitation, an DLP client endpoint, a DLP server, or the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The techniques disclosed herein are not limited to a middleware DLP appliance that monitors network traffic such as has been described, but this will be a typical implementation. The above-described information classification change detection function may be used in any system, device, portal, site, or the like wherein it is desired to analyze data for inclusion of sensitive information.

The term "artifact" should be broadly construed to refer to an item or object of interest (including its content) to a DLP system, policy, component, program or process.

Having described our invention, what we now claim is as follows.

The invention claimed is:

1. A method for detecting changes to security classifications of artifacts in a data loss prevention (DLP) system, the DLP system including a DLP policy that identifies one or more classifications and an enforcement rule associated with a classification, comprising:
configuring, according to the DLP policy, an artifact state machine that defines a set of artifact security classification states and associated transitions among the artifact security classification states;
classifying content of an artifact into a security classification identified in the DLP policy;
determining, in association with a DLP component executing on a hardware element and using the set of artifact security classification states and their associated transitions as defined in the artifact state machine, whether a change in the security classification of the artifact has occurred, the change indicative of an attempt to subvert the enforcement rule defined by the DLP policy; and
if a change in the classification of the artifact has occurred, generating a notification of the change in the security classification.

2. The method as described in claim 1 wherein, with respect to a given artifact, the set of artifact security classification states include an unknown state wherein no attempt has been made to classify the given artifact, an unclassified state wherein a security classification for the given artifact has been attempted but no match has been identified, a declassified state wherein a security classification for the given artifact has existed but no longer matches, and a classified state wherein a security classification has been attempted and a match has been identified.

3. The method as described in claim 2 wherein a transition to the classified state generates a classification event.

4. The method as described in claim 2 wherein a transition from the classified state to the declassified state generates a declassification event.

5. The method as described in claim 2 wherein a transition to the unclassified state as defined by the policy generates an action as defined in the policy.

6. The method as described in claim 1 wherein the method is carried out in an automated manner for each classification in the policy for each of a set of artifacts.

7. The method as described in claim 6 further includes generating a classification rate event if a given number of transitions to a classified state occur for the set of artifacts.

8. Apparatus for detecting changes to security classifications of artifacts in a data loss prevention (DLP) system, the DLP system including a DLP policy that identifies one or more classifications and an enforcement rule associated with a classification, comprising:
a processor;
computer memory holding computer program instructions that when executed by the processor perform a method comprising:
configuring, according to the DLP policy, an artifact state machine that defines a set of artifact security classification states and their associated transitions among the artifact security classification states;
classifying content of an artifact into a security classification identified in the policy;
determining, using the set of artifact security classification states and their associated transitions as defined in the artifact state machine, whether a change in the security classification of the artifact has occurred, the change indicative of an attempt to subvert the enforcement rule defined by the DLP policy; and
if a change in the security classification of the artifact has occurred, generating a notification of the change in the classification.

9. The apparatus as described in claim 8 wherein, with respect to a given artifact, the set of artifact security classification states include an unknown state wherein no attempt has been made to classify the given artifact, an unclassified state wherein a security classification for the given artifact has been attempted but no match has been identified, a declassified state wherein a security classification for the given artifact has existed but no longer matches, and a classified state wherein a security classification has been attempted and a match has been identified.

10. The apparatus as described in claim 9 wherein a transition to the classified state generates a classification event.

11. The apparatus as described in claim 9 wherein a transition from the classified state to the declassified state generates a declassification event.

12. The apparatus as described in claim 9 wherein a transition to the unclassified state as defined by the policy generates an action as defined in the policy.

13. The apparatus as described in claim 8 wherein the method is carried out in an automated manner for each classification in the policy for each of a set of artifacts.

14. A computer program product in a non-transitory computer readable medium for detecting changes to security classifications of artifacts in a data loss prevention (DLP) system, the DLP system having a DLP policy that identifies one or more classifications and an enforcement rule associated with a classification, the computer program product holding computer program instructions which, when executed by the data processing system, perform an automated method comprising:

configuring, according to the DLP policy, an artifact state machine that defines a set of artifact security classification states and associated transitions among the artifact security classification states;

for each security classification in the DLP policy, for each of a set of artifacts:

classifying content of the artifact into a security classification as identified in the DLP policy;

determining, using the set of artifact security classification states and their associated transitions as defined in the artifact state machine, whether a change in the security classification of the artifact has occurred, the change indicative of an attempt to subvert the enforcement rule defined by the DLP policy; and if a change in the security classification of the artifact has occurred, generating a notification of the change in the classification.

15. The computer program product as described in claim 14 wherein, with respect to a given artifact, the set of artifact security classification states include an unknown state wherein no attempt has been made to classify the given artifact, an unclassified state wherein a security classification for the given artifact has been attempted but no match has been identified, a declassified state wherein a security classification for the given artifact has existed but no longer matches, and a classified state wherein a security classification has been attempted and a match has been identified.

16. The computer program product as described in claim 14 wherein the security classification is a DLP content category.

* * * * *